United States Patent [19]

Wells, Jr.

[11] Patent Number: 4,809,644
[45] Date of Patent: Mar. 7, 1989

[54] ROTATABLE BRIDLE STORAGE DEVICE FOR HORSE TRAILERS

[76] Inventor: Joseph A. Wells, Jr., Rt. 1 Box 998, Dinwiddie, Va. 23841

[21] Appl. No.: 20,513

[22] Filed: Mar. 2, 1987

[51] Int. Cl.⁴ .................. A01K 1/00; A01K 29/00
[52] U.S. Cl. ............................. 119/117; 119/13; 211/70
[58] Field of Search ............... 119/7, 10, 13, 20, 117; 296/24 C; 54/64; 211/62, 63, 70

[56] References Cited

U.S. PATENT DOCUMENTS

| | | | |
|---|---|---|---|
| 308,808 | 12/1884 | Smith et al. | 119/7 |
| 586,480 | 7/1897 | Ebersol | 119/117 |
| 1,456,627 | 5/1923 | Delbridge | 119/117 |
| 2,506,467 | 5/1950 | Ragland | 211/70 X |
| 2,639,820 | 5/1953 | Lee | 211/70 X |
| 4,253,576 | 3/1981 | Ford et al. | 211/70 |
| 4,530,538 | 7/1985 | Greene, Jr. et al. | 119/10 X |

FOREIGN PATENT DOCUMENTS 153373 9/1953 Australia ..................... 296/24 C

Primary Examiner—Robert P. Swiatek
Attorney, Agent, or Firm—George M. J. Sarofeen

[57] ABSTRACT

The present invention relates to an improved method of storing bridles for transit in horse transport trailers, which are designed and constructed for the transport of horses. Such transport destinations are to shows rodeos, races or hunts and other events usually promoted by horse lovers at different locations. The improved device of the present invention is provided to allow better use of the available space in such a vehicle. The bridles and other gear are transported off the horse during travel. These accouterments are usually stored in the storage compartment forward of the horses. This space is generally restricted in size. It is most desirable to be able to hang bridles in transit freely suspended so that they do not suffer abrasion from vibration. The present invention provides a rotatable unit with hoods about the periphery on which the bridles hang freely. The result is an expansion of the ability to use the limited available space more effectively.

2 Claims, 3 Drawing Sheets

ROTATABLE BRIDLE STORAGE DEVICE FOR HORSE TRAILERS

FIELD OF THE DISCLOSURE

The present invention relates to an improved method of storing bridles for transit in trailers, designed and constructed for the transport of horses. Such transport destinations are, to shows, rodeos, hunts or other events which may be scheduled at separate geographical locations. The improved device of the present invention is made in the form of a rotatable member with bridle hanger projections disposed outwardly from the periphery of said member. The member is mounted for rotation, by suitable means, suspending it from the under surface of the top of the storage compartment which also serves, on its upper side as the feed shelf of the horse trailer.

The storage compartment, normally provided beneath the feed shelf of a horse trailer, suffers from the defect of having relatively restricted accessibility to a measurable extent, and consequently, it cannot be used to the greatest advantage, in that a good part of the space available is either not reachable with convenience, or is wasted because of the storage fixturing of the prior art. The principal drawback, from the standpoint of bridle storage has been occasioned by the practice of distributing hangers along the rear wall of the storage compartment. To hang or retrieve a bridle from hangers placed farthest from the door, which is provided only at one side, requires contortional positioning and overreaching. The present invention's improved structure provides for greater ease of accessibility to all of the stored bridles by suspending them all adjacent the door and on a rotatable member. This allows access to all the bridles conveniently and utilizes storage space not generally occupied by horse people under normal circumstances. This expands the storage potential of the storage compartment.

BACKGROUND OF THE INVENTION

The use of this invention is in the field of design and construction of horse trailers for the transport of horses, and is an improvement raising the maximum levels of effectiveness of their intended use.

THE PRIOR ART

Horse trailers have evolved over a period of time as a means to transport a horse or horses economically and efficiently. There are many designs of horse carrying vehicles . Some are of full blown proportions approximating in size large automotive vans of the style used in furniture moving. In such relatively large units there are generally provided effectively arranged accommodation areas for the animals plus their attendant gear and foodstuffs. Present in the gear are their bridles and saddles. These are stored in ample facilities in such large vehicles with the bridles arranged on hooks along a wall or partition.

THE PRIOR ART

Horse trailer design has evolved over a period of time to provide means to transport a horse or horses economically and efficiently. There are many such designs of horse carrying vehicles. Some are of magnanimous proportions approximating in size large automotive vans of the style used in furniture moving. In such large units there are generally provided effectively arranged accommodations for the animals plus the storage facilities needed to carry their attendant gear and foodstuffs. Present in the gear are their saddles and bridles. These are stored in ample facilities in such large vehicles with the bridles conveniently accessible along a wall on hangers.

The use of such trailers of grand accommodation and design is not the rule in the case of the modestly financially endowed hobbyist. In such cases the hobbyist finds it more to his or her financial capacity to choose a modest sized horse trailer. These are ingeniously designed in a manner which results in such units being suitable to the instant need of transporting the horse or horses in a trailer unit which, in size and weight, makes it a feasible vehicle to be drawn behind a fairly light motor vehicle or truck of common usage amongst horse lovers.

Although such trailer units or self propelled types are of fairly standard design, they are found to have continued to neglect maximization of access to the very limited cubic area which is devoted to the storage of saddles and bridles during transport. The smallest of such trailer units comprises standing room for one or two horses in the rearmost compartment. The forward portion of this rear compartment comprises a feeder shelf underlying the forwardly extending neck and head of the horses. In effect storage is afforded only in that small portion of the total trailer which underlies the feeding shelf. To aggravate the constrictive nature of this lower forward section for storage purposes, the designer designates a rounded fairing front section to serve the aesthetic requirement, as well as the need to reduce drag due to air flow travelling over the front of the unit during transit.

A door is generally provided for access to this storage area at one side of the front of the unit. For reasons of economy and tradition doors are not generally provided at both sides. This onesidedness of the positioning of the door occasions the need for the features provided by the present invention. To a great extent the provisions of the present invention offset the need for a second door. This access is adequate in a clumsy sort of fashion since that portion of the space away from the door is reached by extending the body and arms into the cavity in a way which puts the person attempting to load saddles and bridles at a distinct disadvantage. Under this handicap however; a person may yet load saddles one atop another to some degree of satisfaction. The more onerous task is addressed when one attemots to arrange bridles in the storage compartment. The provisions for loading bridles are made by setting a series of hooks along the rear wall of the compartment. It is reasonably possible to hang a bridle or two on the hooks provided at the side of the compartment adjacent the door, but in attempting to arrange bridles safely and neatly further into the bowels of the storage interior, great difficulty ensues, since the lower portion of the spaces are now occupied by saddles it is not easy to get a properly arranged position for hanging the bridles freely. In such cases certain precious metal appointed bridles may be put at risk during transit from abrasive interaction with saddles or other entangling gear. This problem affecting proper bridle storage accomodations in horse trailers is not solved in the prior art. It has been proposed that some solution be devised to end this problem of bridle storage for transport in horse trailer storage compartments of restricted capacity, and accordingly:

It is an object of this invention to provide a method and apparatus to provide for improved facilities in storage bridles properly for transit in horse transport vehicles.

It is a further object of the present invention to provide generally for improved accommodations for the transport of gear in storage compartments of horse transport units so that any damage suffered in transit through abrasive interaction will be minimized.

It is a further object of the present invention to improve generally on the features of convenience provided in horse trailers for the storage of bridles.

It is a further object of the present invention to devise means for improving generally upon effective usefulness of horse trailers.

It is a further object of the present invention to provide a rotatable member with peripherally disposed hangers upon which bridles may be hung during transit in horse trailers.

SUMMARY OF THE INVENTION

My invention, comprising the improvements needed to solve the above described disadvantages of the prior art, comprises the use of apparatus affixed adjacent or convenient to one's reach from the storage compartment door. I have provided a rotatable unit which is supportable from a suspended pivot attached to the upper surface of the storage compartment. This unit comprises radially extending hooks emanating from a disc-like centerpiece attached for rotary motion to the pivot support provided and attached to the upper surface of the compartment. The position of the rotatable unit may be chosen to overlie an area left purposely unoccupied by saddles or other gear so that the bridles may hang feely to the fullest extent allowed by the height of the compartment. In this fashion bridles may be hung and draped about the rotatable unit with the potential for any draped bridle to be brought to the forefront for access or disentanglement and removal of the same without interference from other gear stored in the compartment. In this fashion I provide ready access for all stored bridles which are hanging in place neatly without interference and in readily accessible mode.

DESCRIPTION OF THE PREFERRED EMBODIMENT

Now in reference to the drawings I will describe the best mode of implementing my invention.

Figure 1:
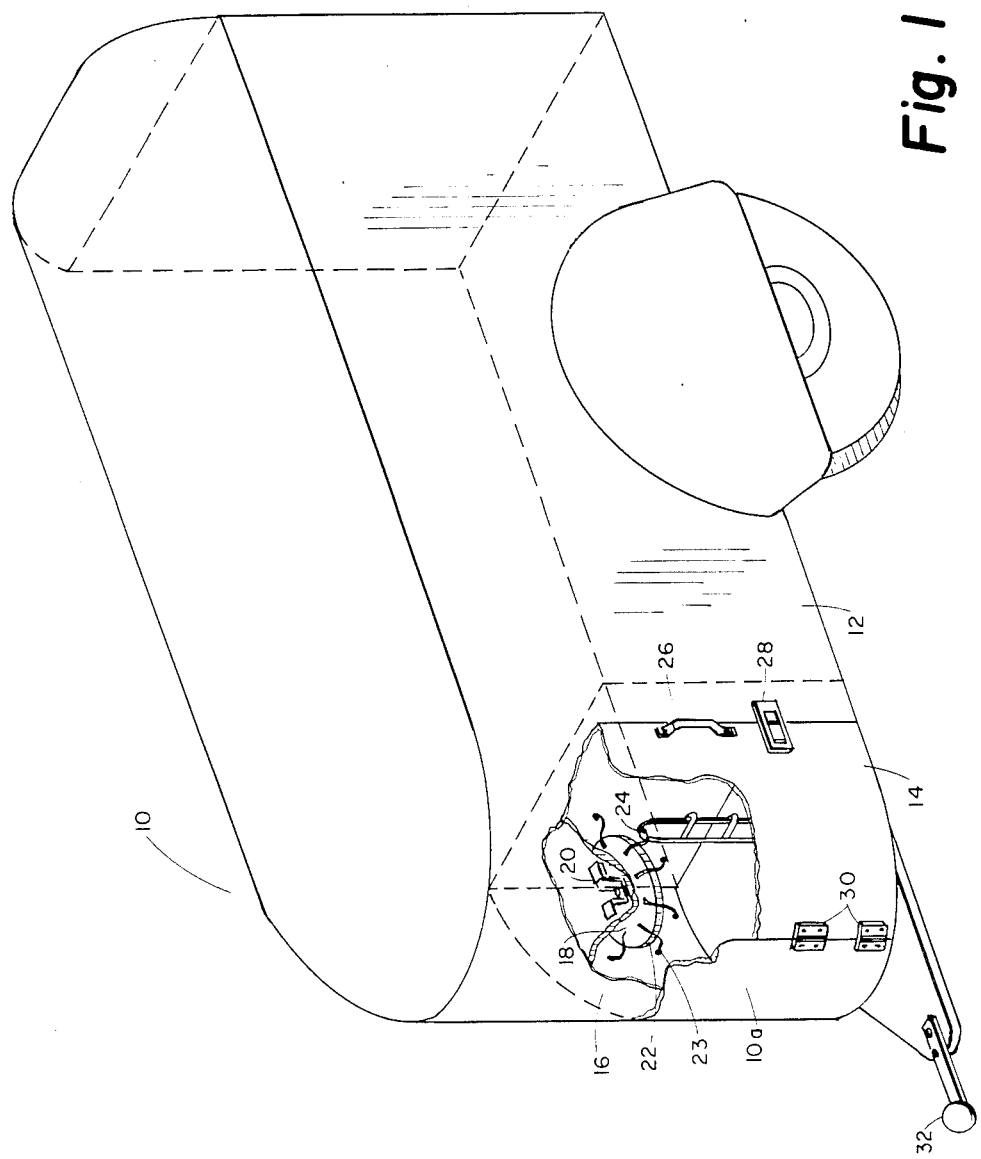
FIG. 1: Is a view in perspective of one form of horse trailer showing my invention in position in the forward storage compartment.
Figure 2:
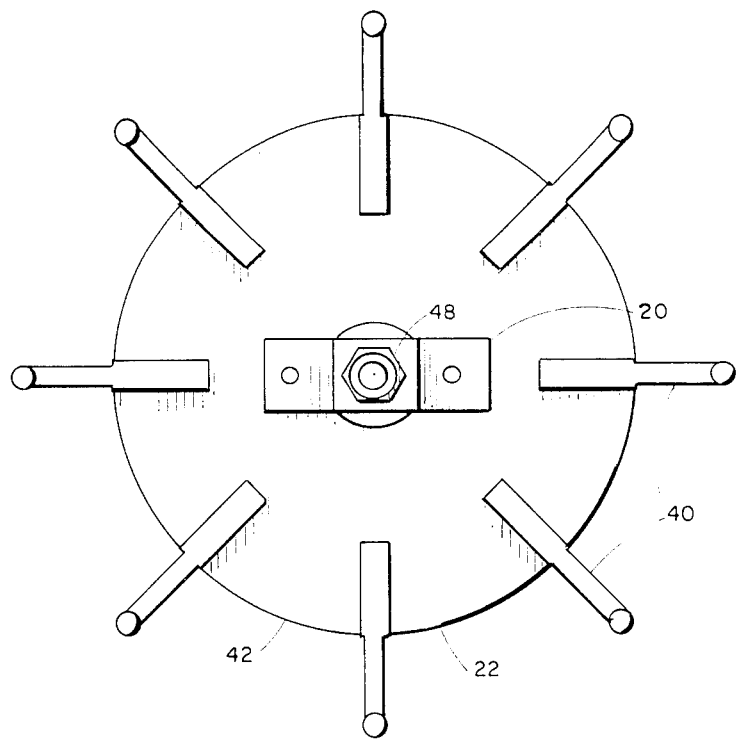
FIG. 2: Is a top plan view of my rotatable unit.
Figure 3:
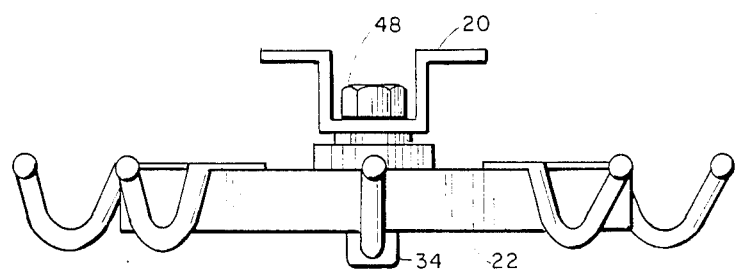
FIG. 3: Is a side view of the unit of FIG. 2.
Figure 4:
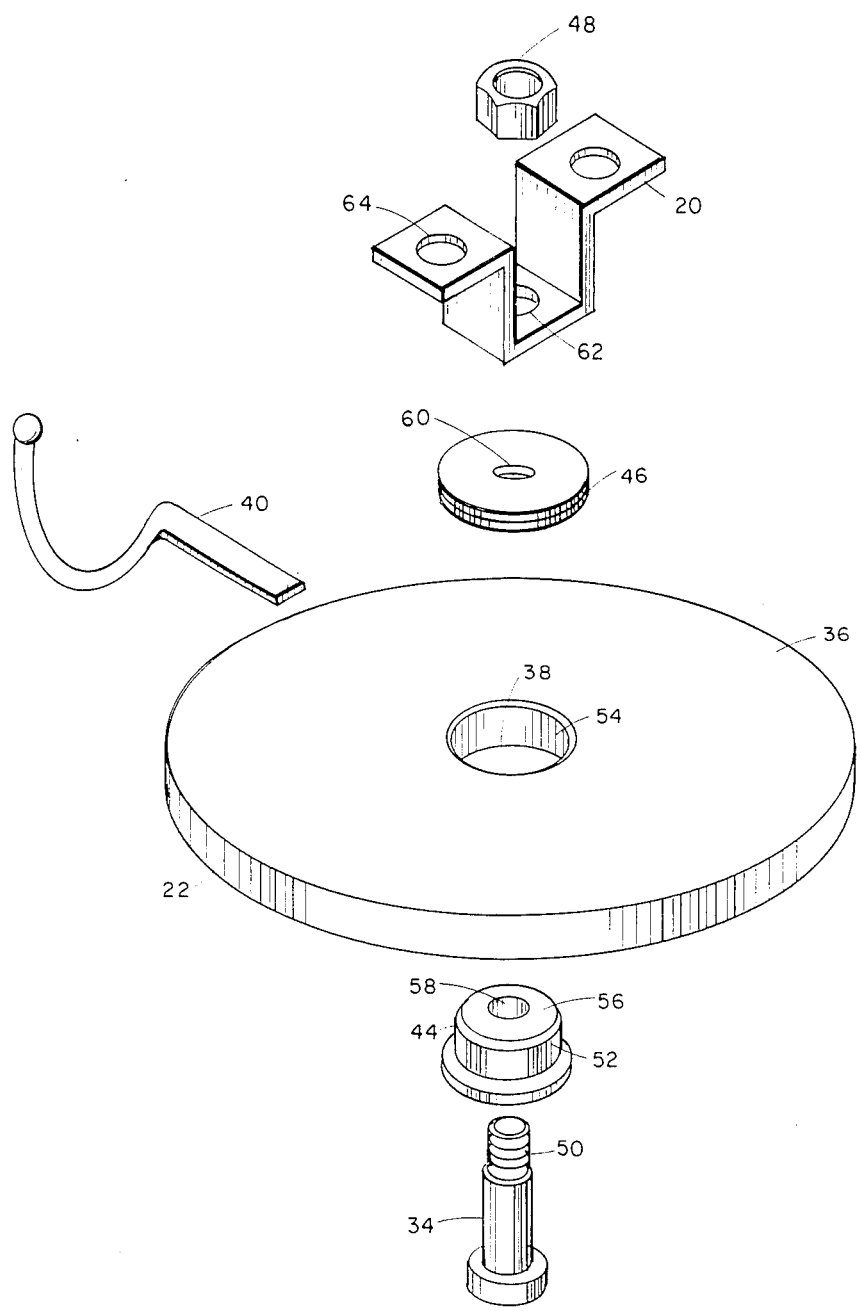
FIG. 4: Is an exploded view of the component parts of the unit of FIG. 2.

Referring to FIG. 1, I have shown one design of horse trailer 10 with cutaway portions at the front end of the trailer 10a taking away a portion of the trailer wall 12 and compartment door 14. Through those cutaway portions there is shown the feed shelf 16 which also is partly cut away to allow portrayal of my rotatable bridle storage unit 18. A fastener 20 is shown in dotted lines as affixed by suitable means to the underside of the feedshelf as shown in FIG. 3. The main body 22 of my bridle storage unit is shown in the form of a disc 36 apertured at the center with the mounting hole 38. Hanger fingers 40 are conventionally secured to a surface of the disc 36 at suitable arcuately spaced intervals and are also arranged to overhang the disc so that a bridle or other gear may be hung thereon.

To assemble my apparatus for proper operation, the bearing assembly 44 is placed within the opening 38 with the outer race 52 in contact with the inner cylinder wall 54 of the opening 38. The support inner race 56 of the bearing assembly 44 is made of a depth greater than the outer race 52 so that when the throughbolt 34 is extended through the bearing center hole 58 and through the holes 60 in the spacer washers 46, then through the bolt opening 62 in the securing bracket 20, and the nut 48 threaded tightly over the bolt threads 50, a secure mounting assembly if provided wherin the disc 36 is free to rotate. The total assembly may then be secured to the underside of the feed-shelf by conventional fastener means through use of the holes 64 in the securing bracket 20. When my invention is thus secured the arcuately spaced apart fingers 40 are made available as radially disposed hanger stations on which bridles 24 may be hung. I provide the disc 22 made of a suitable material such as metal or a plastic of high strength and durability such as a filled melamine or phenolic. I then provide the center opening 38 by punching out or drilling of the material at the center of the disc 22. I provide further a suitable bearing member 44 having an outer diameter slightly under that of the opening 38, a throughbolt 34, a throughbolt hole 62 in the fastener member 20, and a fastening nut 48 adapted to thread over the throughbolt 34 end threads 50. For assembly purposes I provide spacer washers 46 of a diameter slightly smaller than that of the bearing support inner race 56 so that when the whole assembly is put together as shown in the drawings the disc 22 may turn freely and independently of the securing bracket 20 when the bolt 34 is tightened in place by means of the nut 48.

What I claim is:

1. For a trailer for transporting horses having a first compartment for carrying horses and a second compartment for carrying saddles, bridles, supplies and other such gear for use with horses, and wall segments forming a partition between said first and second compartments, a bridle carrier comprising:
    a. a main body member of disc-like configuration,
    b. portions of said main body member defining an opening therethrough located generally centrally of the periphery of said main body member,
    c. a throughbolt for extending through said opening,
    d. means for supporting said main body member for rotative movement about said throughbolt,
    e. bridle hangers each with a hook-like portion and a fastener portion,
    f. means securing the fastener portions of said bridle hangers about the periphery of said body member whereby the hook-like portions extend radially from said periphery,
    g. means for securing said throughbolt to a horizontal upper wall portion of said second compartment for supporting said body member for rotational movement relatively thereof.

2. In a trailer for transporting horses having a first compartment for carrying horses and a second compartment for carrying saddles, bridles, supplies and other such gear for use with horses, and wall segments forming a partition between said first and second compartmenets, a bridle carrier comprising:
  a. a main body member of disc-like configuration,
  b. portions of said main body member defining an opening therethrough located generally centrally of a periphery of said body member,
  c. a throughbolt for extending through said opening,
  d. means for supporting said main body member for rotative movement about said throughbolt.
  e. bridle hangers each with a hook-like portion and a fastener portion,
  f. means securing the fastener portions of said bridle hangers about said periphery of said body member whereby the hook-like portions extend radially from said periphery,
  g. means securing said throughbolt to a horizontal upper wall segment of said second compartment for supporting said body member for rotational movement relatively thereof.

* * * * *

UNITED STATES PATENT AND TRADEMARK OFFICE
CERTIFICATE OF CORRECTION

PATENT NO. : 5,809,644  
DATED : September 22, 1998  
INVENTOR(S) : S. Adachi

Page 1 of 1

It is certified that error appears in the above-identified patent and that said Letters Patent is hereby corrected as shown below:

Column 6,
Line 63, "tappet" should be changed to "taper"

Signed and Sealed this

Eleventh Day of December, 2001

Attest:

Attesting Officer

NICHOLAS P. GODICI
Acting Director of the United States Patent and Trademark Office